United States Patent [19]
Mori

[11] Patent Number: 4,580,195
[45] Date of Patent: Apr. 1, 1986

[54] LIGHT PROJECTOR

[76] Inventor: Kei Mori, 3-16- 3-501, Kaminoge, Setagaya-ku, Tokyo, Japan

[21] Appl. No.: 665,813

[22] Filed: Oct. 29, 1984

[30] Foreign Application Priority Data

Nov. 10, 1983 [JP] Japan .................................. 58-211642

[51] Int. Cl.⁴ ............................................. F21V 7/04
[52] U.S. Cl. ......................................... 362/32; 128/23
[58] Field of Search ................. 362/32, 805, 804, 355, 362/244, 251; 128/23, 395, 396, 397, 398

[56] References Cited

U.S. PATENT DOCUMENTS

| 3,771,516 | 11/1973 | Corriero | 362/32 |
| 3,951,139 | 4/1976 | Kloots | 362/32 |
| 4,403,273 | 9/1983 | Nishioka | 362/32 |

FOREIGN PATENT DOCUMENTS 16765   1906   United Kingdom .................. 362/32

Primary Examiner—Raymond A. Nelli
Attorney, Agent, or Firm—Jordan and Hamburg

[57] ABSTRACT

A light projector for effectively projecting, in order, the light energy transmitted through an optical conductor cable within a wide range of space. The light projector is comprised of an optical conductor rod having a light-receiving edge surface and a light-emitting edge surface and which is bent so that the plane of the light-receiving edge surface and the plane of the light-emitting edge surface intersect each other. The light-receiving edge surface of the optical conductor rod is formed opposite to the light-emitting end surface of an optical conductor member at the light source side of the light projector, and a rotating mechanism is provided for turning the optical conductor rod of the light projector at a linear portion of the optical conductor rod following the light-receiving edge surface thereof.

10 Claims, 5 Drawing Figures

LIGHT PROJECTOR

BACKGROUND OF THE INVENTION

The present invention relates to a light projector for effectively projecting, in order, the light energy transmitted through an optical conductor cable in a wide range of space.

The present applicant has previously proposed various methods and apparatus in which solar rays are focused by a lens or the like, guided into an optical conductor cable and then transmitted onto an optional desired place for use in illumination or for other purposes. Furthermore, the present applicant has also proposed various methods and apparatus in which solar rays, of in other words natural rays, transmitted in such a manner as described above, are employed as a light source for light composition (photosynthesis) for creating chlorella, etc. or as a light source for use in cultivating plants under the ground or in a room.

However, in the case of solar rays transmitted in such a manner as mentioned above which are employed as the light source for use in cultivating plants, it is desirable that the light rays from the light source be projected effectively and in a wide range because of the light composition reaction (photosynthesis). It has already been proposed that the direction of the projected light be changed with the lapse of time.

SUMMARY OF THE INVENTION

It is an object of the present invention to provide a light projector capable of projecting rays transmitted through an optical conductor cable more effectively and over a wider range.

It is another object of the present invention to provide a light projector able to project the rays transmitted through an optical conductor cable more effectively for the purpose of cultivating plants.

It is another object of the present invention to provide a light projector comprised of an optical conductor rod having a light-receiving edge surface and a light-emitting edge surface and which is bent so that the plane of the light-receiving edge surface and the plane of the light-emitting edge surface intersect each other, the light-receiving edge surface of the optical conductor rod being formed opposite to the light-emitting edge surface of the optical conductor member at the light source side of the light projector, and a rotating mechanism for turning the optical conductor rod of the light projector at the linear portion, following the light-receiving edge surface thereof.

The above features and advantages of the present invention will become apparent from the following detailed description and from the enclosed drawings.

DESCRIPTION OF THE PREFERRED EMBODIMENTS

Figure 1:
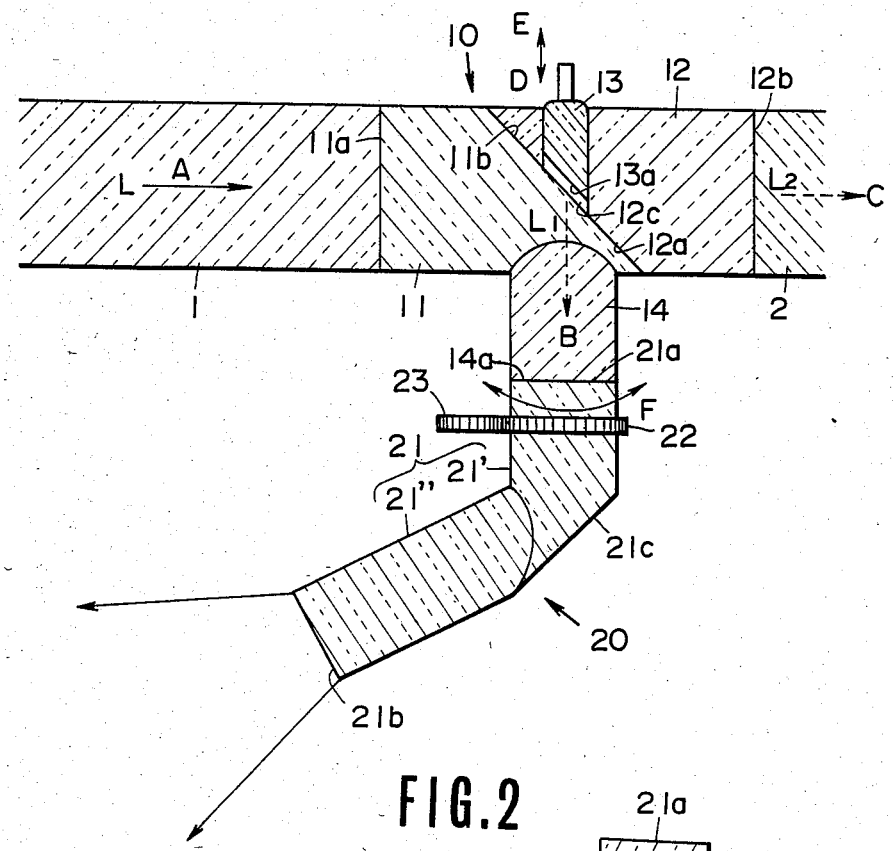
FIGS. 1 through 4 are views illustrating several embodiments of the invention.
Figure 2:
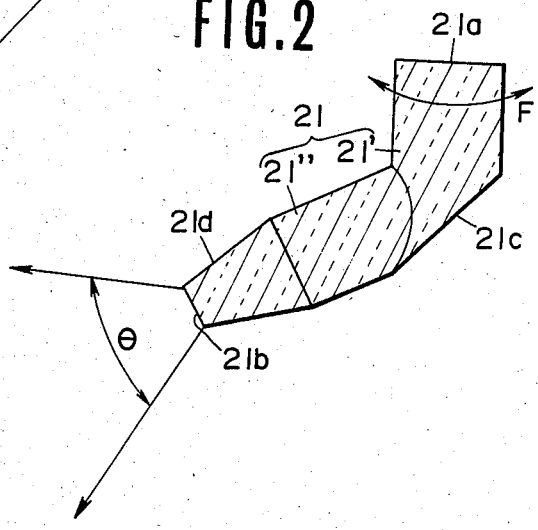

FIG. 1 is a view of one embodiment of the present invention. In FIG. 1, 1 and 2 represent an optical conductor rod and 10 is a light diverting and switching device.

The light diverting and switching device 10 consists of a first transparent cylindrical member 11 having one surface 11a formed on a plane to be connected with the optical conductor rod 1 and another surface 11b formed on an inclined plane, a second transparent cylindrical member 12 having one surface 12a formed on a inclined plane to be connected with the inclined surface 11b of the first cylindrical member 11 and another surface 12b formed on a plane to be connected with the optical conductor rod 2 at the light-emitting side thereof and further having a circular hole 12c elongated toward the inclined surface 12a. A third transparent cylindrical member 13 for use in the light-switching is movably installed in the hole 12c of the second cylindrical member 12, the edge surface 13a of which has a similar inclined surface as the afore-mentioned inclined surface 11b. A fourth transparent cylindrical member 14 is connected with the first cylindrical member 11, the connecting surface of which is opposed to the third cylindrical member 13. The present applicant has already proposed such a light diverting and switching device 10. (Refer to the Japanese Patent Application JAP 58-178928.)

In the case when the light L is transmitted through the first optical conductor rod 1 in a direction shown by arrow A, the inclined surface 13a of the cylindrical member 13 for use in light-switching is separated from the inclined surface 11b of the first cylindrical member 11, the light L is reflected at a portion of the cylindrical member 11 opposite to the inclined surface 13a of the cylindrical member 13 and the light L further propagates in a direction shown by arrow B. On the other hand, in the case where the inclined surface 13a of the cylindrical member 13 for use in the light-switching, comes into contact with the inclined surface 11b of the cylindrical member 11, the light L propagates through those contact-area in a direction shown by arrow C. By displacing the cylindrical member 13 for use in light-switching in a direction shown by arrow D or in a direction shown by arrow E, a part of the light L transmitted from the direction shown by arrow A can be switched to the direction shown by arrow B or the direction shown by arrow C.

The light L, diverted in the direction of arrow B is radiated by the light projector according to the present invention as described hereinafter for use in illumination or for other purposes. A part of the light $L_2$ propagating in the direction of arrow C is diverted and taken out by the same light switching device as mentioned before. In a similar way, the lights are diverted and taken out in order by the same light switching device connected in cascade.

In FIG. 1, 20 is a light projector according to the present invention. The light projector 20 is comprised of an optical conductor rod 21 having a light-receiving edge surface 21a formed opposite to the light-emitting edge surface 14a of the fourth cylindrical member 14 (hereinafter called "the optical conductor member at the light source side of the light projector"). The light projector 20 also comprises a light-emitting edge surface 21b. The light projector 20 is bent so that the plane of the light-receiving edge surface 21a and the plane of light-emitting edge surface 21b intersect each other. A rotation mechanism for rotating the optical conductor rod 21 is provided at the linear portion 21' following the light-receiving edge surface 21a, for instance, gear mechanisms 22 and 23 and a motor, not shown in FIG. 1, for rotating them.

The optical conductor rod 21 is comprised of a linear portion 21' following the light-receiving edge surface 21a and another linear portion 21" connected in an inclined relationship to the side surface of the linear portion 21'. A portion opposite to the connecting junction of the linear portion 21' and the other linear portion 21" is cut along an inclined surface 21c. The light rays propagating through the linear portion 21' are reflected on the inclined surface portion 21c and transmitted to the linear portion 21". Next, the light rays propagate through the linear portion 21" and are radiated outside from the light-emitting edge surface 21b.

When the linear portion 21' is rotated by the rotating mechanism in a direction shown by arrow F, the direction of the light emitted from the light-emitting edge surface 21b varies in accordance with the rotation thereof. In such a manner, it may be possible to illuminate a wide area. In order to effectively perform light composition (photosynthesis) for plants, the light rays must be moved so as to illuminate uniformly and not make any shadows. In respect to the light projector according to the present invention, the projecting direction of the light rays is changed so that there is no shadow at any time. In such a manner, the light composition reaction can be effective. It follows that the light rays can be applied within a wide area and, for this reason, it may be possible to improve the efficiency of light ray utilization.

The present applicant has previously proposed various methods and apparatus in wich the solar rays are focused by a lens or the like and guided into a optical conductor rod and further transmitted through it onto an optional desired place for use in illumination and for other purposes. In the case of using solar rays transmitted through an optical conductor rod as a light source for optical composition of plants under the ground or in a room, the afore-mentioned light projector, according to the present invention, is employed so that the solar rays can be most effectively utilized.

Needless to say, it would seem normal that plants can be cultivated only by means of solar rays, bearing in mind that solar ray collecting device and the optical conductor rod are very expensive. However, if solar rays transmitted in such a manner are used in combination with light rays from an artificial light source in an underground room or any room for that matter, so that the light rays are applied to the plants to the necessary extent for maintaining the life of the plants by adding artificial light rays to solar rays, it may be possible to cultivate plants more economically and more efficiently.

FIG. 2 is a view showing the main portion of a light projector of another embodiment according to the present invention. In FIG. 2, the reference numerals are the same as that of FIG. 1, and the light projector is attached to the part performing the same function as in FIG. 1. Furthermore, in the embodiment of FIG. 2, the light-emitting edge portion of the optical conductor rod 21" is tapered as indicated at 21d so as to decrease the diameter thereof toward the light-emitting edge surface 21b. The opening exit-angle of the light rays propagated through the optical conductor rod 21" is increased at this tapered portion, and the light emitting angle of the light rays discharged from the light-emitting edge 21b is also increased so that a wider range of illumination can be possible as compared with the light projector shown in FIG. 1.

Figure 3:
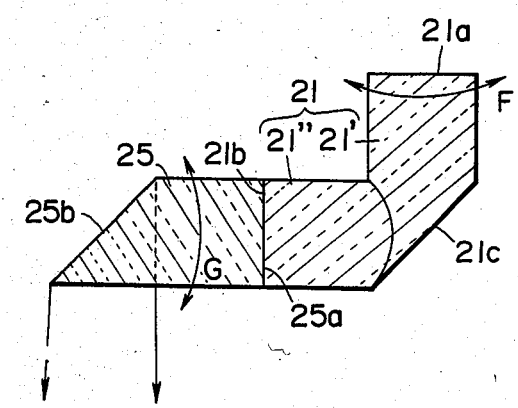

FIG. 3 is a view showing the main portion of still another embodiment according to the present invention. In FIG. 3, a linear optical conductor rod 25 having a light-receiving edge-surface 25a is opposed to the light-emitting edge-surface 21b of the optical conductor rod 21, and a reflection edge-surface 25b formed on an inclined plane, is installed at the light-emitting edge surface side of the optical conductor rod 25. The optical conductor rod 25 is rotatable in the direction of arrow G. In such a construction, the light rays from the optical conductor rod 21 are transmitted into the optical conductor rod 25 and reflected on the inclined surface 25b thereof. The light rays are emitted outside from the optical conductor rod 25. When the inclined surface 25b of the optical conductor rod 25 is in the state shown in FIG. 3, namely, the inclined surface 25b is situated at the upward position, the light rays are emitted downwardly. On the contrary, when the inclined surface 25b is situated at the downward position, the light rays are emitted upwardly. In other words, the light rays are emitted in the opposite direction to the position of the inclined surface.

Consequently, if the optical conductor rod is rotatable in the direction as shown by arrow G, the direction of the light emission can be optionally changed to down, level, and upward positions respectively. For instance, in the case of employing the light projector, according to the present invention, as the light source for cultivating plants, the light rays can be radiated from the upper side toward small plants as shown in FIG. 3. Depending on the size of the plants, the radiation angle is gradually adjusted. If the light rays are radiated obliquely from the upper side, it may be possible to supply light rays even to the leaves at the lower side of plants.

Figure 4:
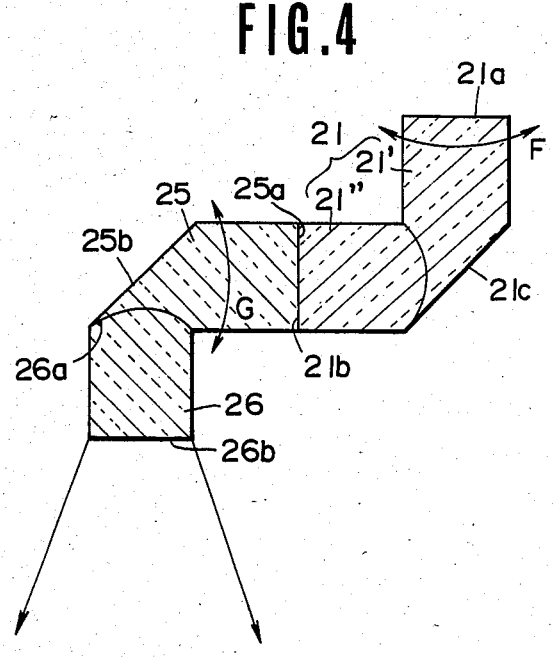

FIG. 4 is a view showing the main portion of still another embodiment according to the present invention. In FIG. 4, one edge 26a of still another optical conductor rod 26 is firmly attached by adhesive at a location opposite to the inclined surface 25b of the optical conductor rod 25, i.e. the light-emitting portion of the embodiment as shown in FIG. 3. By use of such a construction, the light rays reflected on the inclined surface 25b are guided into the optical conductor rod 26 and emitted from the light-emitting edge-surface 26b of the optical conductor rod 26 in order to make the direction of the radiation uniform. Furthermore, in the case of this embodiment, although not shown in FIG. 4 the light-emitting edge-side thereof may be formed in a tapered configuration so as to decrease the diameter toward the light-emitting edge surface side such as shown in FIG. 2. It may be easily understood that the radiation angle of the light rays can be changed so as to increase it.

Figure 5:
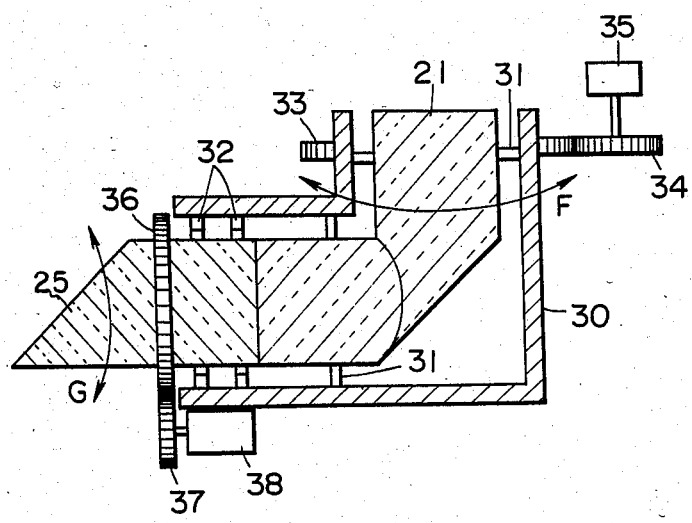
FIG. 5 is a view showing an example of actualizing the embodiments shown in FIGS. 3 and 4.

FIG. 5 is a view showing an example of actualizing the embodiments shown in FIGS. 3 and 4. In FIG. 5, 30 is a housing for accommodating the optical conductor rods 21 and 25 mentioned above, 31 is a supporting spacer for supporting the optical conductor rod 21 in the housing 30, 32 is a bearing for rotatably supporting the optical conductor rod 25 in the housing 30, 33 and 34 gears for rotating the housing 30, 35 is a motor for applying the rotating force to these gears, 36 and 37 are gears for rotating the optical conductor rod 25, and 38 is a motor for applying the rotating force to those gears.

The housing 30 is rotated by the motor 35 in a direction shown by arrow F and the optical conductor rod 25 is rotated by the motor 38 in a direction shown by arrow G. In such a manner, the embodiments shown in FIGS. 3 and 4 are intended to be actualized.

However, in the case of employing the light projector according to the present invention for cultivating plants, there is no need to illuminate the ceiling. Therefore, it may be possible that the light-emitting edge portion or the optical conductor rod 25 be rotated from the downward direction to an approximate horizontal direction, entirely within the range of an angle of about 180°. Consequently, it may be possible to control or construct the motor 38 or the gears 36 and 37 in such a manner as described heretofore.

As is apparent from the foregoing description, according to the present invention, the solar rays transmitted through the optical conductor cable can be effectively utilized for cultivating plants.

What is claimed is:

1. A light projector receiving light from a light-emitting end surface of an optical conductor member, comprising an optical conductor rod having a light-receiving edge surface and a light-emitting edge surface, said optical conductor rod being bent such that the plane of said light-receiving edge surface and the plane of said light-emitting edge surface intersect each other, said light-receiving edge surface being disposed opposite to said light-emitting end surface of said optical conductor member at the light source side of the light projector, said optical conductor having a linear portion following said light-receiving edge surface, and a rotating mechanism for rotating said optical conductor rod at said linear portion.

2. A light projector according to claim 1, wherein said optical conductor rod has a tapered portion which decreases in diameter as said light-emitting edge surface is approached.

3. A light projector receiving light from a light-emitting end surface of an optical conductor member comprising a first optical conductor rod having a light-receiving edge surface and a light-emitting edge surface, said first optical conductor rod being bent such that the plane of said light-receiving edge surface and the plane of said light-emitting edge surface intersect each other, said light-receiving edge surface being disposed opposite to said light-emitting end surface of said optical conductor member at the light source side of the light projector, and a second optical conductor rod formed linearly, said second optical conductor rod having a light-receiving edge surface disposed opposite to the light-emitting edge surface of said first optical conductor rod and a light-reflecting edge surface formed on an inclined surface, said light-receiving edge surface of said first optical conductor rod being rotatably disposed opposite to the light-emitting end surface of said optical conductor member at the light source side of the light projector, said light-receiving edge surface of said second optical conductor rod being rotatably disposed opposite to the light-emitting edge surface of said first optical conductor rod.

4. A light projector according to claim 3, wherein said second optical conductor rod has a light-emitting edge surface for emitting light reflected by said light-reflection edge surface of said second optical conductor rod.

5. A light projector according to claim 4 further comprising a third optical conductor rod extending from said light-emitting edge surface of said second optical conductor rod for guiding and emitting reflected light rays from said light-reflecting edge surface on said second optical conductor rod.

6. A light projector according to claim 5, wherein said third optical conductor rod has a light-emitting edge surface, said third optical conductor rod having a tapered portion which decreases in diameter as said light-emitting edge surface of said third optical conductor rod is approached.

7. A light projector according to claim 3 further comprising a unitary housing on which said first and second optical rods are disposed, first rotary means for rotating said housing about the axis of said first optical conductor rod, and second rotary means on said housing for rotating said second optical conductor rod within said housing.

8. A light projector according to claim 7, wherein said first rotary means rotates said unitary housing along with said first and second optical conductor rods on said housing.

9. A light projector according to claim 7, wherein said first optical conductor rod has a rod portion extending from said light-receiving edge surface of said first optical conductor rod, said first rotary means rotating said unitary housing such that said first optical conductor rod rotates about the axis of said rod portion.

10. A light projector according to claim 7, wherein said second optical conductor rod has a rod portion extending from said light-receiving edge surface of said second optical conductor rod, said second rotary means rotating said second optical conductor rod about the axis of the last of said rod portion.

* * * * *